(12) United States Patent
Winkelmann et al.

(10) Patent No.: US 7,416,070 B2
(45) Date of Patent: Aug. 26, 2008

(54) CLUTCH OPERATOR FOR A DISCONNECTABLE CLUTCH IN MOTOR VEHICLES

(75) Inventors: Ludwig Winkelmann, Erlangen (DE); Steffen Dittmer, Aurachtal (DE); Bernhard Klöpfer, Windsheim (DE)

(73) Assignee: Ina Schaeffler KG (DE)

( * ) Notice: Subject to any disclaimer, the term of this patent is extended or adjusted under 35 U.S.C. 154(b) by 299 days.

(21) Appl. No.: 11/243,689

(22) Filed: Oct. 5, 2005

(65) Prior Publication Data

US 2006/0081439 A1 Apr. 20, 2006

(30) Foreign Application Priority Data

Oct. 18, 2004 (DE) ......... 10 2004 050 871
Dec. 24, 2004 (DE) ......... 10 2004 062 586

(51) Int. Cl.
*F16D 23/14* (2006.01)
(52) U.S. Cl. ..................... 192/98; 192/110 B
(58) Field of Classification Search ............. 384/612
See application file for complete search history.

(56) References Cited

U.S. PATENT DOCUMENTS 4,969,755 A * 11/1990 Parzefall ............. 384/612

2002/0117372 A1* 8/2002 Winkelmann et al. ......... 192/98
2002/0134641 A1* 9/2002 Klopfer et al. ............... 192/98

FOREIGN PATENT DOCUMENTS

| DE | 101 25 691 A1 | 7/2002 |
| DE | 101 14 846 A1 | 10/2002 |
| DE | 101 24 663 A1 | 11/2002 |

* cited by examiner

*Primary Examiner*—Rodney H Bonck
(74) *Attorney, Agent, or Firm*—Ostrolenk, Faber, Gerb & Soffen, LLP

(57) ABSTRACT

A clutch operator for a disconnectable clutch useful in a motor vehicle, and having a self-adjusting release bearing supported on a housing and in the form of a rolling-contact bearing designed as an inclined-shoulder bearing. The bearing has an outer bearing ring, a rotating inner bearing ring and rolling bodies guided between the rings. An adjusting ring at the inner bearing ring. A sliding element in a supporting region of the adjusting ring on the inner bearing ring, and being in the form of complementary spherical-cap segments. A noise-reducing and wear-reducing coating, on which a spring element connected to the disconnectable clutch is supported at a radially oriented annular flange of the adjusting ring.

28 Claims, 8 Drawing Sheets

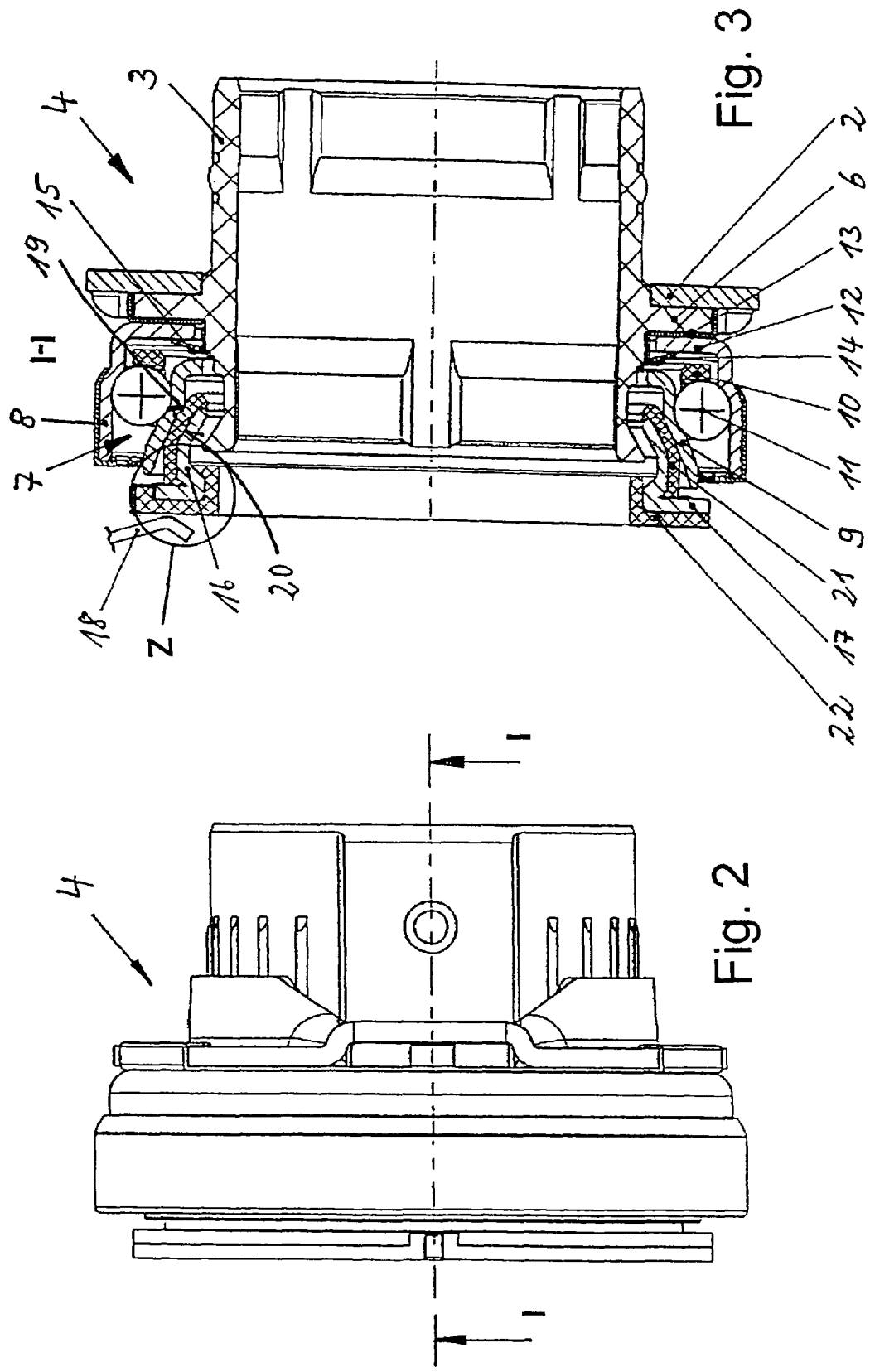

CLUTCH OPERATOR FOR A DISCONNECTABLE CLUTCH IN MOTOR VEHICLES

FIELD OF THE INVENTION

The invention relates to a clutch operator for a disconnectable clutch in motor vehicles, having a self-adjusting release bearing, which is supported on a housing. The bearing is in the form of a rolling-contact bearing which is designed as an inclined-shoulder bearing. It has an outer bearing ring arranged in a rotationally fixed position, a rotating inner bearing ring, and rolling bodies guided between the two rings.

BACKGROUND OF THE INVENTION

Clutch operators of this type are known, for example, from DE 101 14 846 A1 and DE 101 24 663 A1, wherein an adjusting ring is supported against that side of the inner bearing ring which faces away from the rolling bodies. A spring element is assigned to the disconnectable clutch, and is preferably in the form of a cup spring, which bears nonpositively, by means of spring tongues, against the end side of a radially oriented annular flange of the adjusting ring. Furthermore, a sliding element which is fixed in position on the adjusting ring is fitted in a supporting region of the adjusting ring on the inner bearing ring. That adjusting ring is in the form of complementary spherical-cap segments thereof in order to achieve automatic orientation or pivoting of the release bearing with respect to the adjusting ring.

Furthermore, DE 101 25 691 A1 discloses a clutch operator of the generic type, in which the inner, rotating bearing ring has an annular flange, on which a run-on disk is fixed in position and on which the spring element of the disconnectable clutch is supported.

OBJECT OF THE INVENTION

The invention is based on the object of developing a clutch operator of the general type in such a manner that the space which it takes up in the axial direction is reduced compared to known technical solutions, clutch grabbing or sticking and associated axially vibrations are avoided or at least reduced, manufacturing-related alignment errors can be compensated for. Further, it reduces wear in a contact region between the spring tongues or the cup spring of the disconnectable clutch, on the one hand, and the release bearing, on the other hand.

SUMMARY OF THE INVENTION

Accordingly, the object which is set is achieved, in accordance with the invention, by a clutch operator for a disconnectable clutch in motor vehicles, having a self-adjusting release bearing, which is supported on a housing. The release bearing is in the form of a rolling-contact bearing which is designed as an inclined-shoulder bearing. It has an outer bearing ring arranged in a rotationally fixed position, a rotating inner bearing ring, and rolling bodies guided between the two rings. The inner bearing ring is assigned an adjusting ring. A sliding element is fitted in a supporting region of the adjusting ring on the inner bearing ring, in the form of complimentary spherical-cap segments thereof, for arranging the release bearing so as to be pivotable. A radially oriented annular flange of the adjusting ring is assigned a noise-reducing and wear-reducing coating, on which a spring element connected to the disconnectable clutch is supported.

This advantageous combination particularly effectively improves the self-adjustability of the release bearing and optimizes the noise emissions therefrom. This operating performance is established in particular because the friction and accordingly the wear between the corresponding components, preferably between the sliding element and the inner or adjusting ring and between the adjusting ring and the spring element is reduced considerably. In practice, as a result, an increase in the operating and driving comfort is observed on account of reduced pedal actuation forces, increasing the efficiency of the clutch operator. Furthermore, the invention prevents disadvantageous clutch grabbing.

On account of the reduced wear at the spring element or its spring tongues, furthermore, reduction in the frictional rusting is observed, which means that in operation, there is less loss of oil at the lubrication of the splined clutch hub, and there is no sticking of the clutch hub on the splined profile of the transmission input shaft. It is known that if the clutch hub sticks on the splined profile, the friction-lining disk is disadvantageously not sufficiently separated from the pressure disk, and accordingly is still driven. During a gear shift, this leads to considerable loads being applied during synchronization. This can make the gear shift much more difficult, which usually leads to unpleasant loss of driving comfort, which is avoided by the use of the design elements of the invention.

Accordingly, the sliding element is preferably formed from a high-strength and wear-resistant plastic and designed as an add-on part, which is produced separately and can be secured to the adjusting ring, or as a sliding element which is formed integrally on the adjusting ring by way of an injection-molding process.

With regard to the coating of the annular flange of the adjusting ring, this coating may be formed by a separate add-on part in the form of a run-on disk. This results in particularly effective damping of noise by gap damping between the adjusting ring and the run-on disk. In this respect, a run-on disk made from a high-strength and wear-resistant plastic, a ceramic or a hard metal is recommended. Furthermore, the coating of the annular flange of the adjusting ring may also be formed by a plastic run-on disk formed integrally on the annular flange by an injection-molding process.

In order in particular to prevent or minimize slipping of the cup spring tongues in the initial operating hours and resulting run-in noise, and to improve the self-centering of the release bearing, the noise-reducing and wear-reducing coating made from plastic may, at least in the region of the contact zone with the spring element or the cup spring tongues, have a molded microstructure which can be plasticized at least at its surface under load from the spring element.

Moreover, it is possible to provide that the sliding element is designed as a separate add-on part on the annular flange, in the form of the spherically configured section of the adjusting ring, and is produced from a plastic, such as a thermoset, or a ceramic.

Plastics which are preferably provided for producing the sliding element and/or the coating of the annular flange of the adjusting ring are thermoplastics based on a highly heat-resistant polyamide or other highly heat-resistant thermoplastics, such as polyaryl ether ketones (PAEKs).

From the range of polyamides, polyamide 46 (PA 46) or semiaromatic polyamides, such as polyphthalamide (PPA) or polyhexamethylene terephthalamide (PA6T) or copolymers thereof with polyhexamethylene isophthalamide (PA6T/6I) and/or polyhexamethylene adipamide (PA6t/66, PA6T/6I/66) or polymethylpentamethylene terephthalamide (PA6T/MP- MDT) with friction- and wear-reducing as well as strength-enhancing additives have proven suitable.

In this respect, additives provided are carbon fibers and/or aramid fibers in an amount by weight of from 1 to 40%, preferably carbon fibers in an amount by weight of from 20 to 30%, aramid fibers in an amount by weight of from 1 to 15%, and solid lubricants, such as molybdenum disulfide, in an amount by weight of from 1 to 5%, together with or as an alternative graphite in an amount by weight of from 1 to 10%, together with or as an alternative a friction reducer, such as polytetrafluoroethylene (PTFE), in an amount by weight of from 1 to 30%, preferably a PTFE content of from 5 to 15% by weight, together with or as an alternative polyphenylene sulfone (PPSO2, Ceramer®) in an amount by weight of from 1 to 30%, preferably 1 to 15% by weight.

In a further advantageous configuration of the invention, the sliding element and the coating of plastic are formed integrally on the adjusting ring in one operation by the injection-molding process mentioned. This results in cost benefits in terms of production and logistics, since there is now no need for separate plastic parts to be produced, stored and provided for assembly. This also eliminates complex fixing and securing to the adjusting ring.

Furthermore, it has proven advantageous if the sliding element and the coating are formed as a single piece by material-to-material bonding. Accordingly, material of the sliding element merges into the coating, which leads to cost savings by virtue of the fact that the injection mold can be of simpler form and the flow of the plastic polymer material as it is being molded around is facilitated.

As is also provided by the invention, it is possible for a separately produced sliding element and/or a separately produced coating in the form of add-on parts to be positively connected and/or cohesively bonded to the adjusting ring.

Moreover, it is possible to provide that a separately produced sliding element in the form of an add-on part be positively connected and/or cohesively bonded to the inner bearing ring.

Materials made from thermosetting plastics have proven useful for applications which are subject to high thermal loads. In this context, preference is given to a thermosetting molding compound with friction-reducing and wear-reducing additives. A material of this type may preferably be formed from a phenol-formaldehyde resin compound (PF) with glass and/or carbon fibers and/or graphite and/or polyphenylene sulfone (PPSO2, Ceramer®). However, ceramic materials with suitable friction-reducing and wear-reducing additives may also prove suitable.

Furthermore, it is proposed that the adjusting ring has cutouts, stamped formations, apertures and/or grooves for fixing the sliding element and/or the coating as add-on parts or as parts formed integrally in an injection-molding process. In this context, it is preferable for the grooves to be radially oriented.

As the invention finally also provides, it may also be recommended for the sliding element to be formed by a hard-material coating at least on the adjusting ring in the spherical-cap-like segment region thereof. It is also possible for the coating of the annular flange of the adjusting ring to be formed by a hard-material coating.

Accordingly, a DLC coating (DLC=diamond-like carbon) which is known per se is recommended for the abovementioned hard-material coating and can for its part be applied, for example, by a plasma surface coating process, to the surface of the adjusting ring which is exposed to wear.

Also suitable is a hard-material coating which comprises hydrogenated carbon layers with tungsten fractions, for example those referred to by the designation W-C:H.

The hard-material coating used may advantageously be titanium niobium nitride or titanium niobium oxynitride.

Another hard-material coating which may be used consists of tetrahedral carbon without hydrogen.

Chromium nitride layers in which nanodispersions of chromium carbide CrC are incorporated can also be used as the hard-material coating. These hard-material coatings are distinguished by a particularly high hardness and high wear resistance. Moreover, a hard-material coating of this type, i.e. one which includes chromium nitride, has a high bonding strength to the component which is to be coated in a targeted fashion.

Moreover, the hard-material coating may be configured as a multiple layer. Suitable in this respect is in particular the abovementioned material provided with tungsten W-C:H plus at least one coating of a-C:H. This multiple layer is advantageously low in friction and at the same time wear-resistant.

What is known as a supernitride layer is also suitable as a hard-material coating in which the entire release bearing or certain contact zones can be coated in accordance with the invention.

To achieve the minimum possible friction at the spherical contact zone between the adjusting ring and the rotating bearing ring, it is proposed to use a hard-material coating which has been modified with a view to frictional optimization, and which is preferably applied in a single operation.

The hard-material coating is preferably applied to at least one contact surface and/or at least one running surface of the clutch operator in a thickness of preferably less than or equal to 0.015 mm, at most up to 0.1 mm.

The hard-material coating can be applied by means of a plasma surface coating or by means of a laser beam, preferably operated in pulsed mode, to the contact zone of a component of the release bearing which is exposed to wear.

Other features and advantages of the present invention will become apparent from the following description of the invention which refers to the accompanying drawings.

BRIEF DESCRIPTION OF THE DRAWINGS

The invention is explained in more detail below with reference to the appended drawings and on the basis of a number of embodiments. In the drawings:

FIG. 2 shows a detailed partial illustration of the clutch operator shown in FIG. 1, FIG. 3 shows a sectional illustration through a clutch operator according to the invention in accordance with a first preferred embodiment, in which sliding element and coating are formed as add-on parts and are connected to the adjusting ring—section "I-I" in FIG. 2 (variant 1)

DETAILED DESCRIPTION OF THE DRAWINGS

Figure 1:
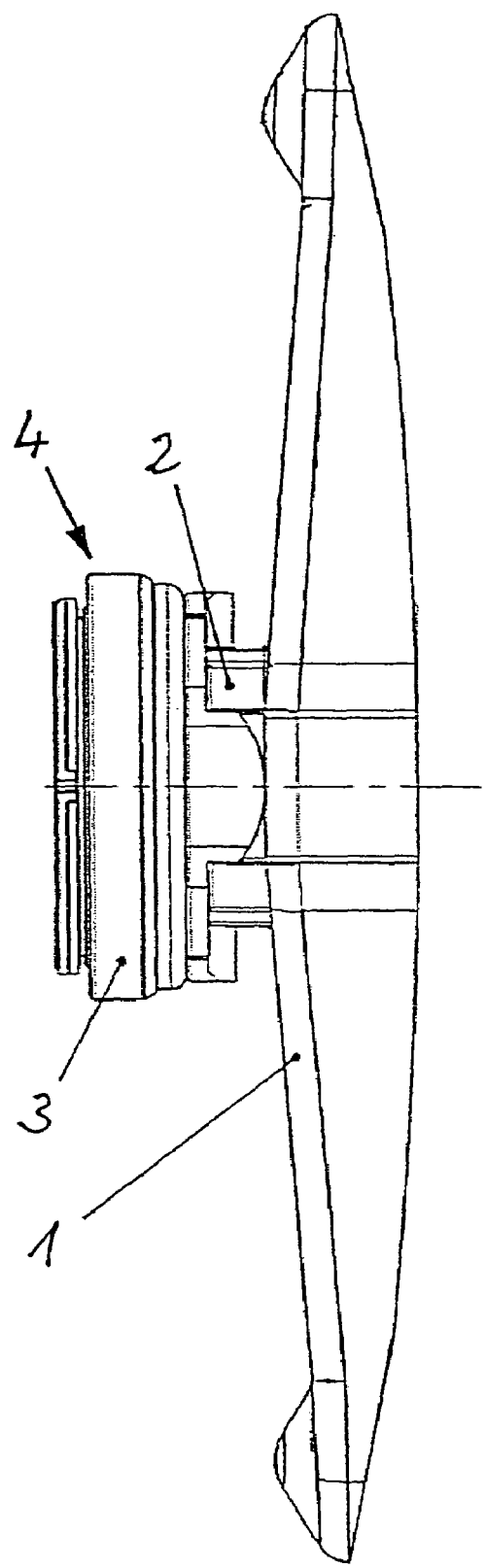
FIG. 1 shows a side view of a mechanical clutch actuating system with clutch lever and clutch operator.
Figure 4:
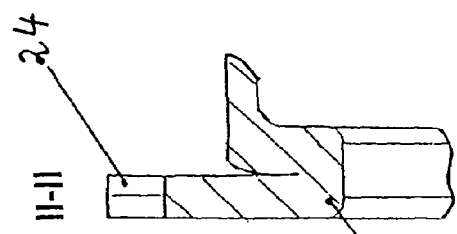
FIG. 4 shows the detail "Z" from FIG. 3 (variant 2)
Figure 5:
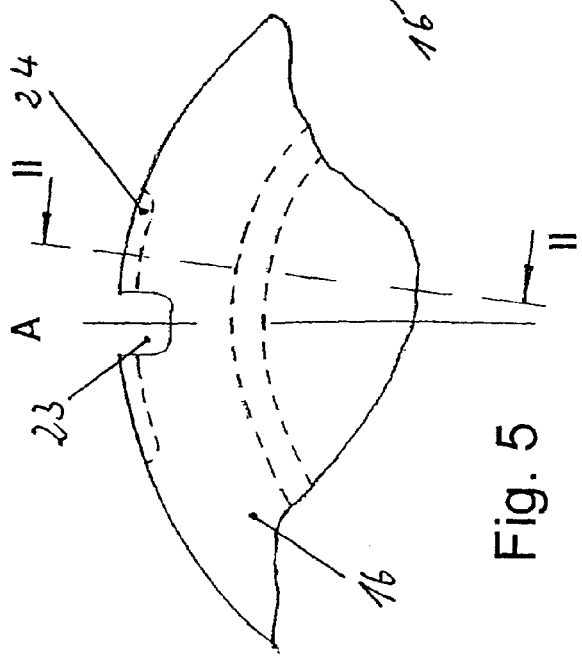
FIG. 5 shows the view "A" in accordance with FIG. 4.
Figure 6:
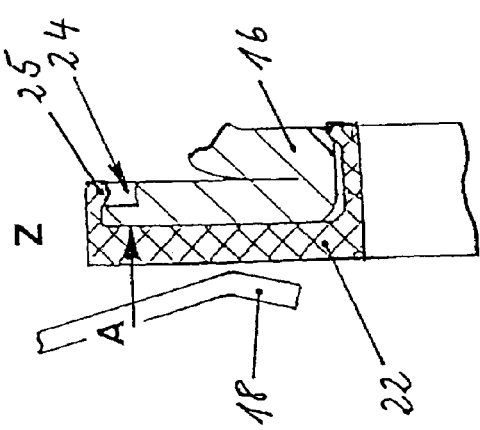
FIG. 6 shows the section "II-II" in accordance with FIG. 5.

FIG. 1 shows a mechanical clutch actuating system, which is known per se, for a disconnectable clutch in a motor vehicle. The system has a clutch lever 1, including an actuating element 2 which engages an axially displaceable housing 3 of a clutch operator 4. It is operatively connected in the usual way, via a cable (not shown in more detail) or a suitable actuator, to a clutch pedal in a passenger compartment of a motor vehicle.

In the assembled state, the housing 3 of the clutch operator 4 is guided on a guide sleeve (not shown in more detail) which surrounds a drive shaft 5 (FIG. 9 to 11), which via the clutch connects the internal combustion engine of the motor vehicle to a manual transmission.

The clutch operator 4 shown in FIGS. 2 and 3 comprises a self-adjusting release bearing 7, which is supported on a radially disposed flange 6 of the housing 3 and is in the form of a rolling-contact bearing designed as an inclined-shoulder bearing. The release bearing 7 for its part is formed by a rotationally fixed outer bearing ring 8 and a rotating inner bearing ring 9 and by rolling bodies 11 which are guided and held between these rings in what is referred to as a snap-action cage 10.

Figure 9:
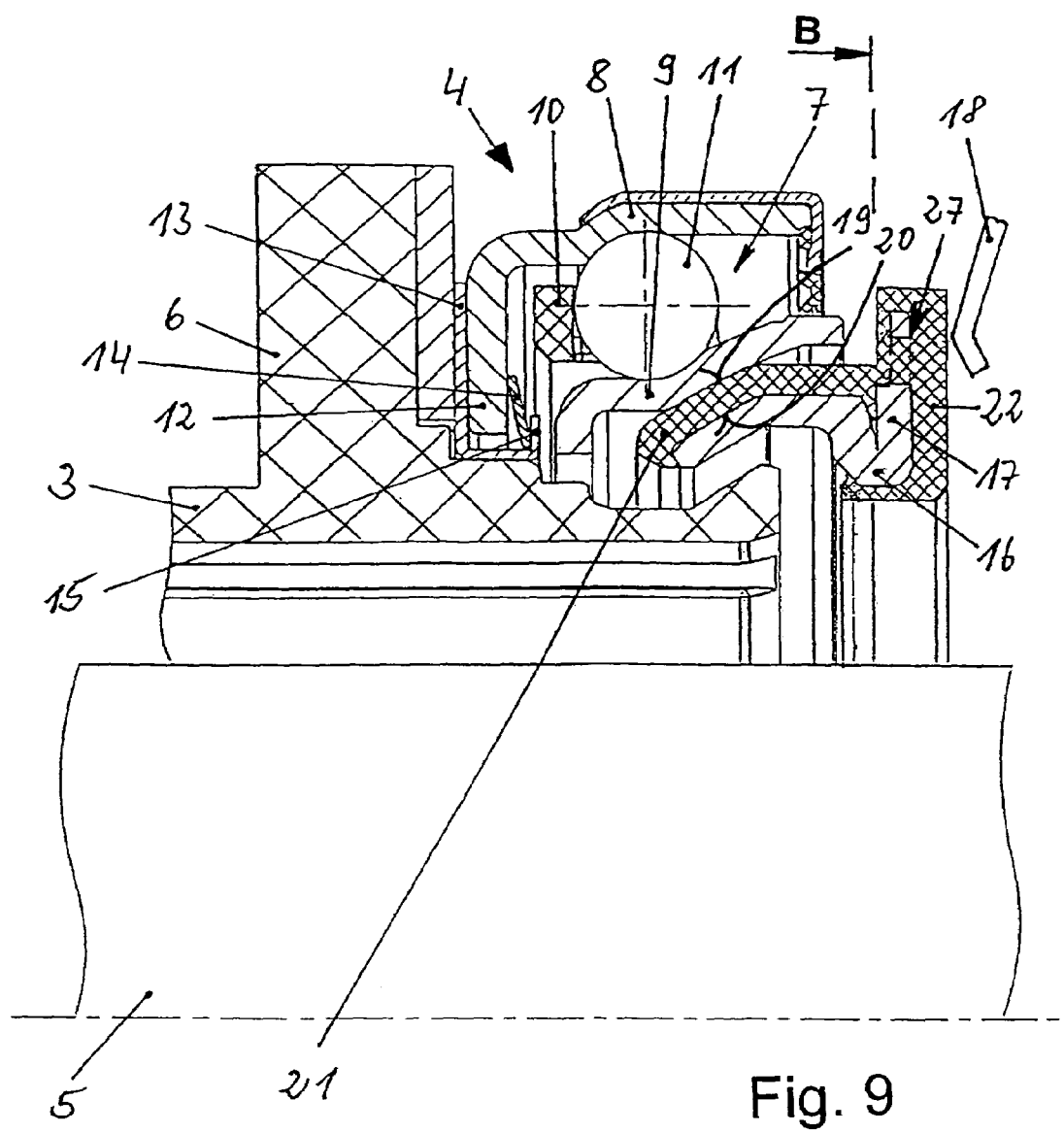
FIG. 9 shows a partial section through another preferred embodiment of the clutch operator, in which sliding element and coating have been fixed to the adjusting ring by means of injection molding.

As is also shown in FIG. 9, the outer bearing ring 8, which is of rotationally fixed design, is supported, by way of a radially inwardly directed annular base 12, on the flange 6 of the housing 3, with a metal annular holding plate 13 in between. To achieve a nonpositively locking bearing of the annular base 12, a cup spring 14 is fitted between an edge 15 of the metal annular holding plate 13 and the annular base 12. In the present case, the metal holding plate 13 is angled off in the region of the flange 6, although to improve its secure seating on the flange 6, it may also be guided or bent around it (not shown in more detail).

An adjusting ring 16 is supported on that side of the rotating inner bearing ring 9 which faces away from the rolling bodies 11. A spring element 18, which is assigned to the disconnectable clutch and is, for example, a cup spring with spring tongues, bears nonpositively against the end side of the annular flange 17 of the adjusting ring 16.

To achieve automatic alignment of the release bearing 7 with respect to the adjusting ring 16 or with respect to the pivotable arrangement, and to avoid a steel-steel pairing, a sliding element 21 is fitted between the inner bearing ring 9 and the adjusting ring 16, in a supporting region of the adjusting ring 16 against the inner bearing ring 9, which region is in the form of complementary spherical-cap segments 19, 20 thereof. This is because the ring 9 and element 21 are predominantly made from steel sheet by deep-drawing and/or stamping.

It is preferable for the sliding element 21 to comprise a high-strength, wear-resistant plastic. This makes it possible to use thermoplastics based on a highly heat-resistant polyamide or other highly heat-resistant thermoplastics, for example polyaryl ether ketones (PAEKs).

With regard to polyamides which may be used, in this context it has proven suitable to employ polyamide 46 (PA 46) or semiaromatic polyamides, such as polyphthalamide (PPA) or polyhexamethylene terephthalamide (PA6T) or copolymers thereof with polyhexamethylene isophthalamide (PA6T/6I) and/or polyhexamethylene adipamide (PA6t/66, PA6T/6I/66) or polymethylpentamethylene terephthalamide (PA6T/MPMDT) with friction- and wear-reducing as well as strength-enhancing additives.

With knowledge of the core concept of the invention, recommended additives are in particular carbon fibers and/or aramid fibers in an amount by weight of from 1 to 40%, preferably carbon fibers in an amount by weight of from 20 to 30%, aramid fibers in an amount by weight of from 1 to 15%, and solid lubricants, such as molybdenum disulfide, in an amount by weight of from 1 to 5%, together with or as an alternative graphite in an amount by weight of from 1 to 10%, together with or as an alternative a friction reducer, such as polytetrafluoroethylene (PTFE), in an amount by weight of from 1 to 30%, preferably a PTFE content of from 5 to 15% by weight, together with or as an alternative polyphenylene sulfone (PPSO2, Ceramer®) in an amount by weight of from 1 to 30%, preferably 1 to 15% by weight.

The sliding element 21 may either be produced separately and secured as an add-on part to the adjusting ring 16 or it may be molded integrally on the adjusting ring 16 by an injection-molding process, known per se. Moreover, it is possible for the connection between these two components to be realized by snap-action, hot-stamping and/or ultrasonic riveting of the components.

In an advantageous combination with the features described above, the radially oriented annular flange 17 of the adjusting ring 16 has a noise-reducing and wear-reducing coating 22, against which the spring element 18 connected to the disconnectable clutch is supported (FIG. 3 and FIG. 9).

In this case too, a conventional steel-steel pairing is avoided by virtue of the fact that the coating 22 is either formed by a separate add-on part in the form of a run-on disk and then preferably consists of a high-strength and wear-resistant plastic, or is formed by a plastic run-on disk which is molded integrally on the annular flange 17 by an injection-molding process, known per se. In both variants, the above-mentioned thermoplastics, which are based on a highly heat-resistant polyamide or other highly heat-resistant thermoplastics, for example, polyaryl ether ketones (PAEKs) are also used. Refer to the statements above with regard to the advantages of a coating 22 of this type. In particular, thermosets or ceramic materials, modified with agents which improve their sliding properties, are used for applications which are subject to high thermal loads.

Furthermore, it has been established that a microstructure which is formed in the coating 22, at least in the region of the contact zone between the coating 22 and the spring element 18, is particularly advantageous especially in the initial operating hours or in the run-in phase of the disconnectable clutch, since this microstructure prevents slipping of the spring element 18 or of the cup spring or its spring tongues, with this microstructure being plasticized under the loading from the cup spring tongues. Consequently, run-in noise is prevented or at least minimized to a considerable extent, and the self-centering action of the release bearing 7 is improved.

With regard to fixing a separately produced coating 22 in the form of a run-on disk on the adjusting ring 16, it is preferable to employ positively locking and/or cohesively bonding securing measures. Suitable embodiments of these are illustrated in more detail in FIGS. 3 to 8.

According to these embodiments, the separately produced coating 22 or run-on disk can be snap-fitted to the adjusting ring 16, as shown in FIGS. 3 to 7. In that case, as can be seen particularly clearly from FIGS. 4 to 7, at least one, but preferably a plurality of recesses 23 are distributed uniformly over the circumference and are adjoined by axial stamp formations 24 provided on the radially outer side of the adjusting ring 16. The stamp formations 24 serve as latching receptacles for corresponding latching lugs 25 formed integrally on the coating 22 or the run-on ring. The recesses 23 primarily serve to prevent rotation, by virtue of projections 26 (not shown in more detail) of the coating 22 penetrating axially into them.

This creates a compact design taking up an extremely small amount of axial and radial space. Fluctuations in diameter, caused by different coefficients of thermal expansion of the plastic coating 22 and the adjusting ring 16 made from steel, and any change in volume of the coating 22 as a result of atmospheric humidity, can easily be compensated for by this particular design.

Figure 7:
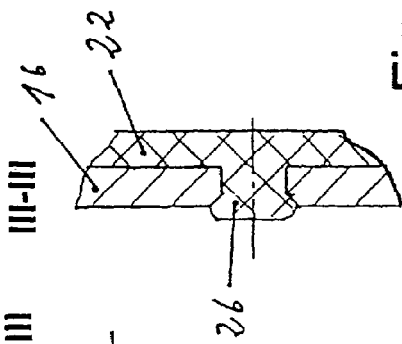
FIG. 7 shows the detail "Z" from FIG. 3 (variant 3), in this case shown rotated about a vertical axis.
Figure 8:
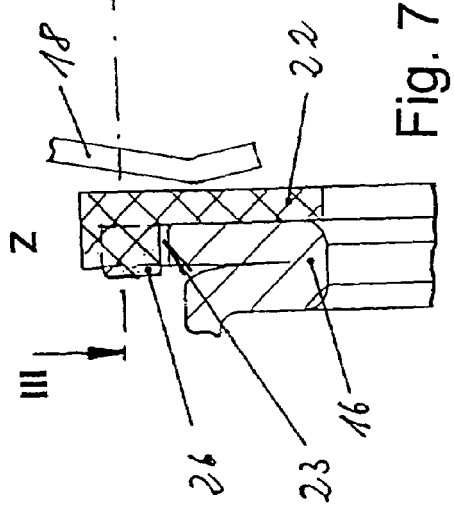
FIG. 8 shows the section "III-III" from FIG. 7.

FIGS. 7 and 8 clearly show the projections 26 extend through recesses 23 in the adjusting ring 16 and are deformed, for example, by ultrasound.

Of course, the coating 22 may also, in addition or alone, be joined to the adjusting ring 16 by adhesive bonding, i.e. cohesively.

Of course, comparable wear-reducing measures can also be used for a sliding element 21 which is produced separately and is to be secured to the adjusting ring 16. In this case, the sliding element is either produced from a low-wear material or is coated with a wear-reducing material. In this respect, reference is made to the combination of FIGS. 12 to 16.

Figure 12:
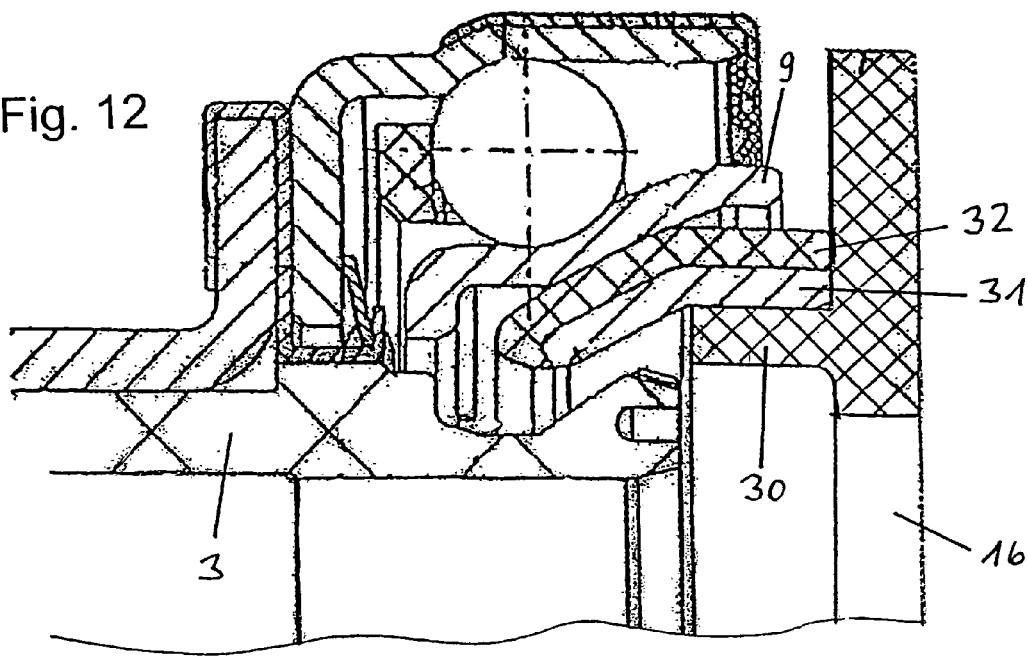
FIG. 12 shows a clutch operator in which a sliding element designed as a separate component is secured to the adjusting ring.

FIG. 12 shows a clutch operator of the type described, in which a partially spherical holding ring 31 is fitted onto a hollow-cylindrical section 30 of the run-on ring 16. On its radially outer side, the holding ring 31 bears a pushed-on, separately produced sliding element 32 which is in sliding contact with that side of the inner bearing ring 9 which faces away from the rolling body. In this case, the hollow-cylindrical section 30 and the holding ring 31 as well as the sliding element 32 are nonpositively and/or positively connected to one another.

Figure 13:
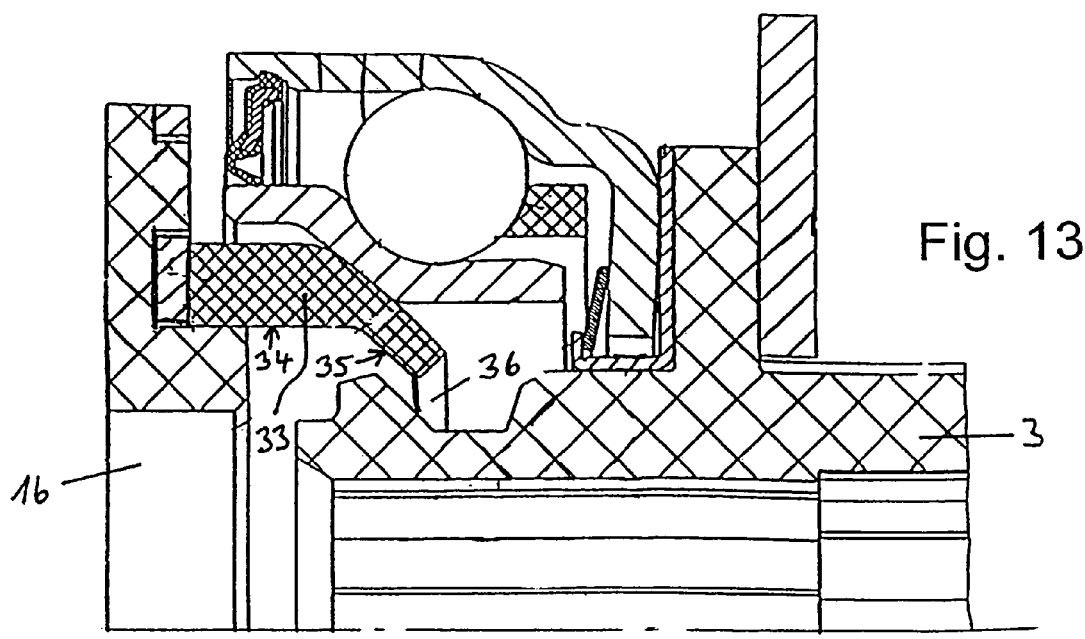
FIG. 13 shows a clutch operator in which the adjusting ring is connected to a sliding element and is held on the housing of the clutch operator by means of this sliding element.

FIG. 13 shows a further embodiment of the clutch operator, in which the run-on ring 16 is nonpositively and/or positively connected to a sliding element 33. The sliding element 33 has a hollow-cylindrical connecting section 34, is shaped spherically in the region 35 facing away from the latter and has an axial end section 36 which is directed substantially radially inward. In this case, the connecting section 34 is used for connection to the run-on ring 16, the spherical section 35 is used for sliding bearing on the inner bearing ring 9 and the axial end section 36 is used to hold the run-on ring 16 captively on the housing 3 of the clutch operator.

Figure 14:
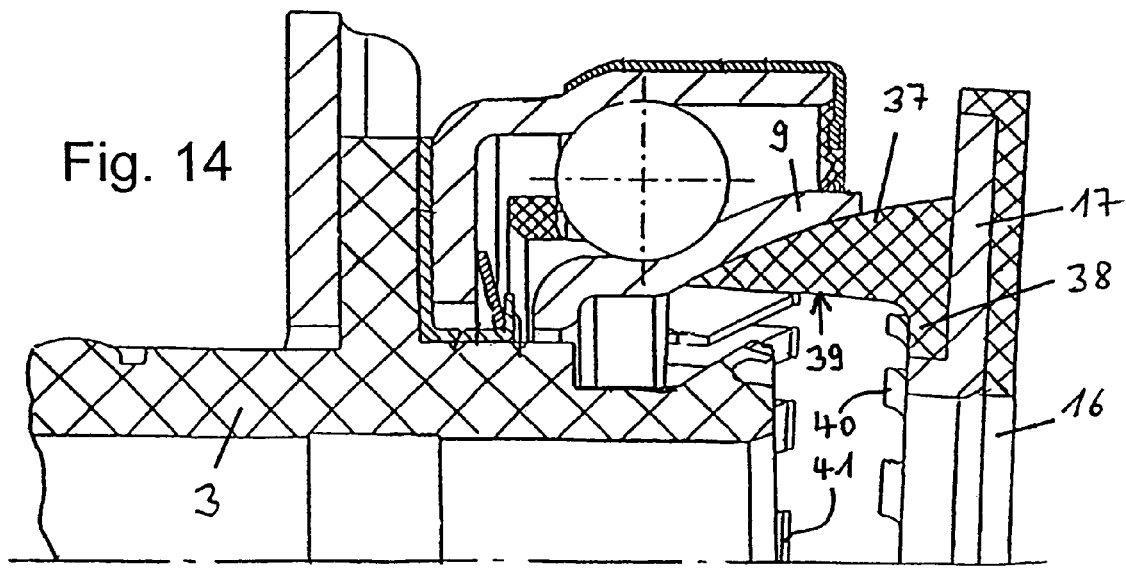
FIG. 14 shows a first variant of the clutch operator shown in FIG. 13.

FIG. 14 shows a clutch operator in which a sliding element 37 is an annular component, having a connecting section 38 for securing it to the run-on ring 16 and a bearing section 39 for sliding bearing against the inner bearing ring 9. Accordingly, the sliding element 37 is designed as a separate component and is nonpositively and positively connected to the annular flange 17. It preferably comprises a thermosetting material or a ceramic material. This combination of sliding element 37 and run-on ring 16 is held captively on the housing 3 of the clutch operator by latching lugs 40 and 41 which are formed on the mutually facing end sides of housing and run-on ring. FIG. 14 illustrates a tilted operating position of the run-on ring 16, in which the components are held captively by the latching lugs 40 and 41 located below the line of mirror symmetry.

Figure 15:
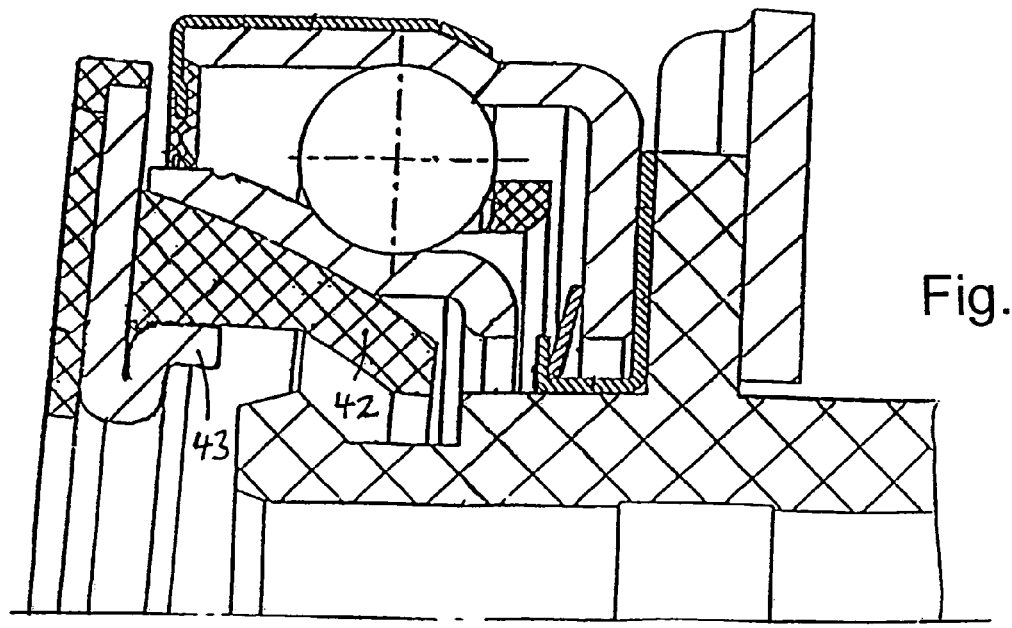
FIG. 15 shows a second variant of the clutch operator shown in FIG. 13.

The clutch operator illustrated in FIG. 15 shows a similar structure to the clutch operator illustrated in FIG. 13, but in FIG. 15, the sliding element 42 is supported on a short flange section 43 of the run-on ring 16.

Figure 16:
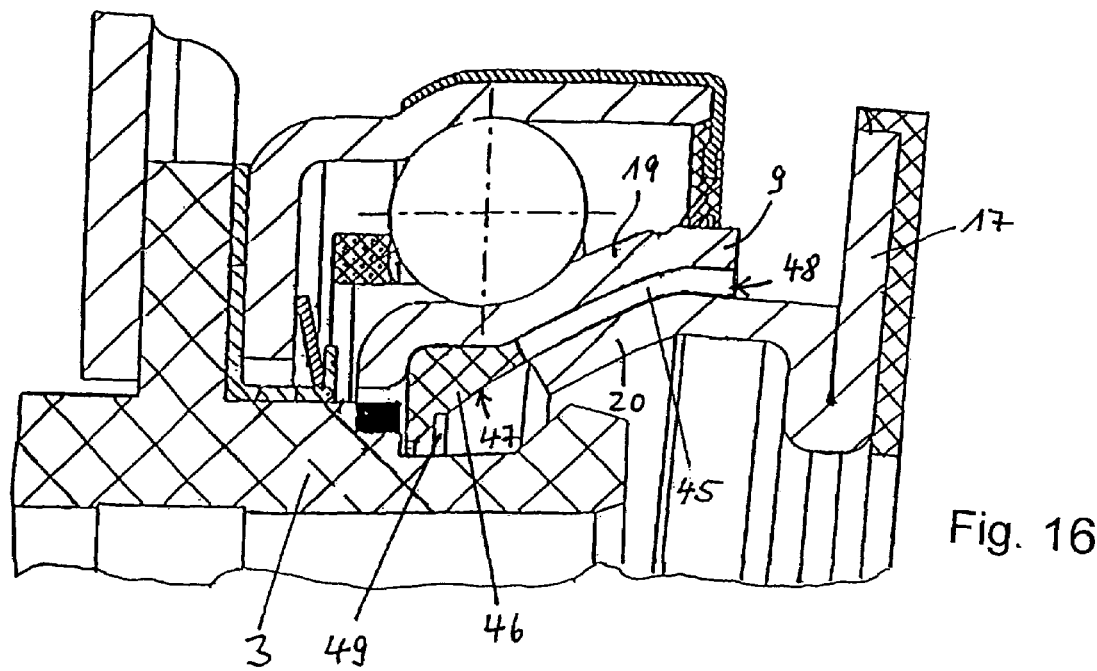
FIG. 16 shows a clutch operator in which a separate sliding element is connected to the inner bearing ring.

Moreover, FIG. 16 shows a clutch operator with a separately produced sliding element 46, which is arranged between the inner bearing ring 9 and the housing 3. This sliding element 46 has a section 47 close to the housing and a section 48 remote from the housing. The section 47 of the sliding element 46 which is close to the housing is held on the housing for axial securing by a securing ring 49, causing the inner bearing ring 9 to also be held indirectly on the housing 3.

The section 48 which is remote from the housing is arranged between a spherical section (spherical-cap segment 20) of the run-on ring 16 and the spherical section (spherical-cap segment 19) of the inner bearing ring 9 and has axially oriented slots 45, which can compensate, preferably elastically, for the changes in dimensions, dependent on operating temperature of the two spherical sections (spherical-cap segments 19 and 20).

Figure 17:
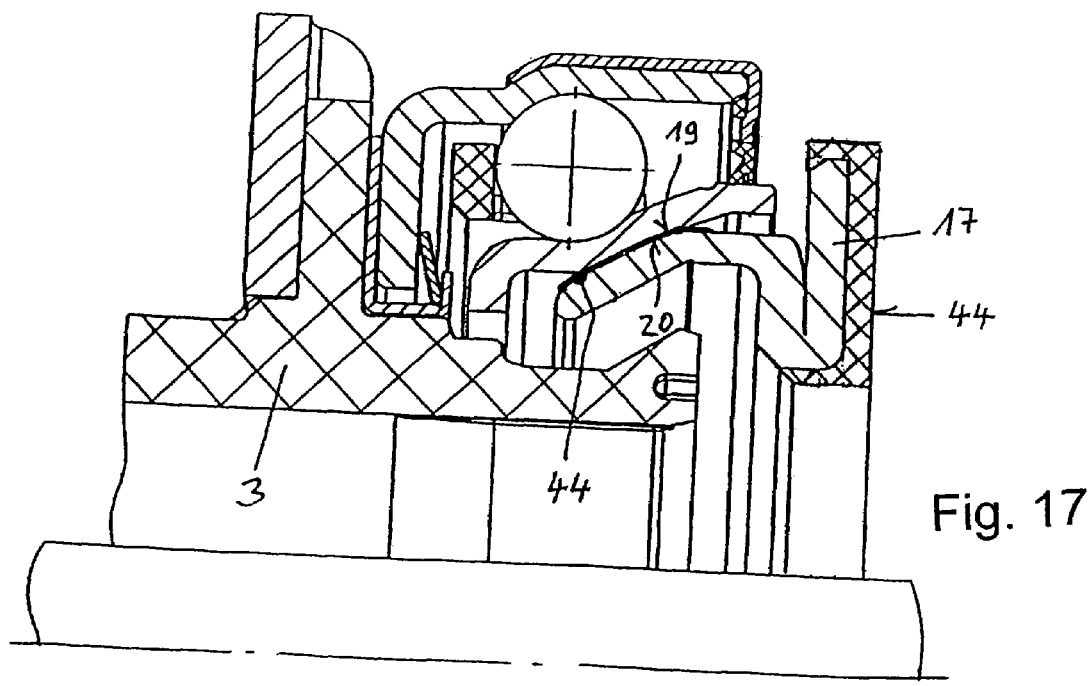
FIG. 17 shows a clutch operator in which a wearing layer of a hard-material coating has been applied to or formed on the adjusting ring and/or the inner bearing ring.

In the clutch operator shown in FIG. 17, a hard-material coating 44 is formed on or applied to the radially outer side of the spherical section (spherical-cap segment 20) of the run-on ring 16 and/or the radially inwardly facing side of the inner bearing ring 9 (spherical-cap segment 19). This hard-material coating is in this case in the form of a DLC coating which consists of a diamond-like carbon material or at least has diamond-like materials properties. A coating 44 of this type may also be applied to that end of the run-on ring 16 which is used for contact with the spring tongues of the cup spring.

As stated above, it is also possible for the sliding element 21 and the coating 22 made from plastic to be formed integrally on the adjusting ring 16 by an injection-molding process.

Figure 10:
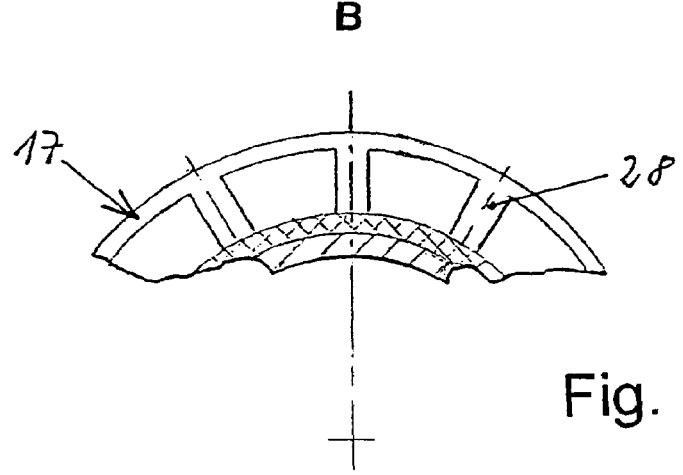
FIG. 10 shows view "B" from FIG. 9.
Figure 11:
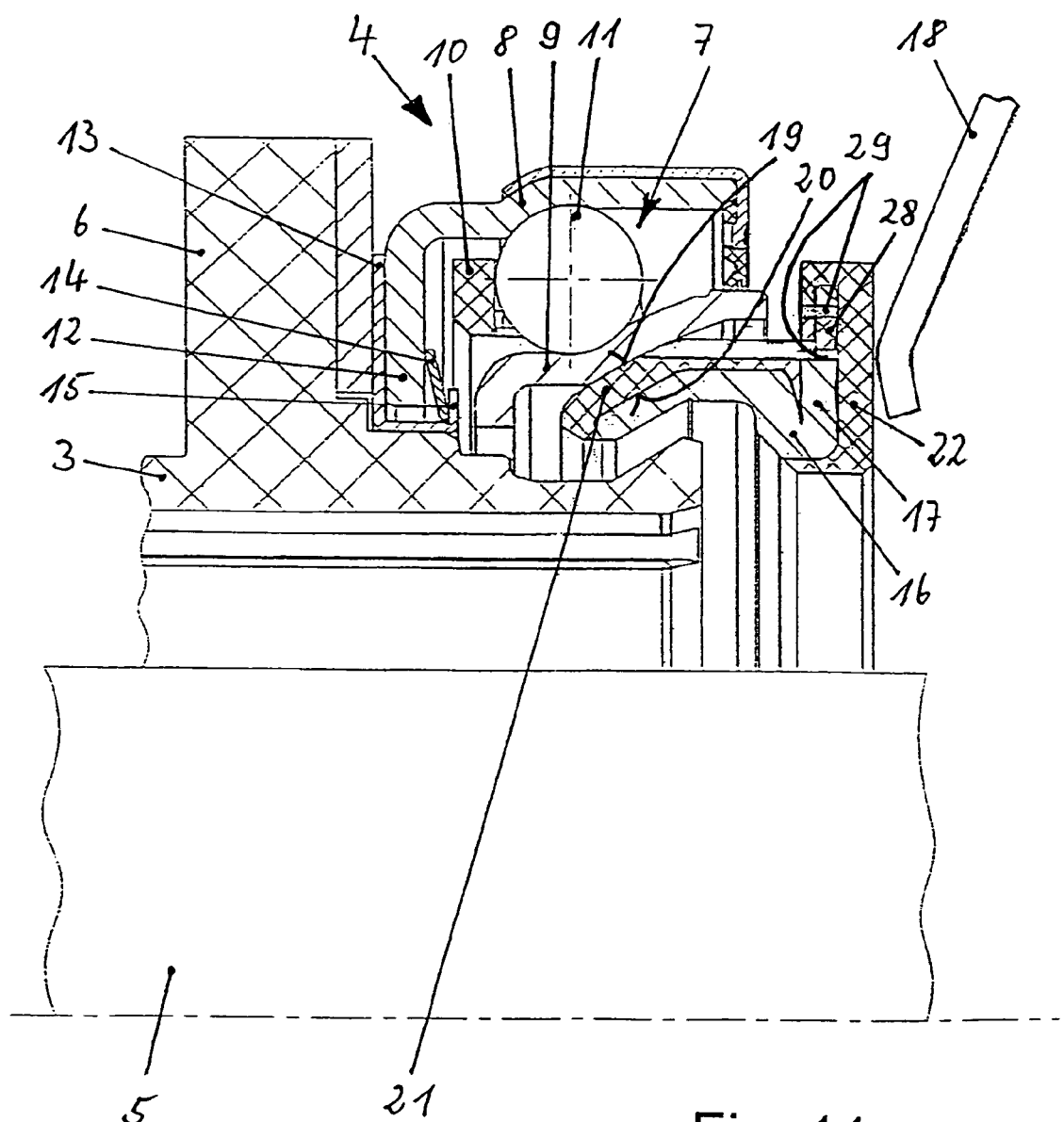
FIG. 11 shows a refinement of the clutch operator shown in FIG. 9.

FIGS. 9 to 11 show an assembly of this type, in which the sliding element 21 and the coating 22 have been formed integrally on the adjusting ring 16 in a single operation by means of the above mentioned injection-molding process and have thereby been material-to-material bonded, i.e. formed integrally as a single piece. This provides cost savings, in particular by virtue of a simplified injection mold.

In this respect, to facilitate the flow of the plastic polymer compound when molding around the adjusting ring 16, apertures 27 and grooves 28 which are oriented radially with respect to the center, with parallel groove walls, are provided in the annular flange 17 of the adjusting ring 16.

To minimize shearing forces in the plastic parts, furthermore, what are described as openings 29 are present in the region of the apertures 27 in the annular flange 17. On account of the radially oriented grooves with parallel groove walls, these openings allow the plastic to expand without obstacle in the event of temperature changes (cf. in this respect FIG. 11).

The above exemplary embodiments are mainly aimed at producing the sliding element 21 and the coating 22 from a single material, namely a suitable plastic. Of course it may also be beneficial, as encompassed by the invention, for other suitable and/or optionally different materials to be used for this purpose.

For example, it may be advantageous for the coating 22, 44 of the annular flange 17 in the form of the abovementioned separate add-on parts to be formed from a suitable ceramic or a suitable hard metal, whereas the respective sliding element comprises plastic.

It is also possible to provide a conventional adjusting ring 16 made from steel sheet placed in the region of the surfaces which are susceptible to wear, and preferably in the spherical-cap-like segment region 20 and/or in the region of the annular flange 17 in which the spring element 18 engages nonpositively, the sheet having the above mentioned hard-material coating 44, for example, a DLC coating (DLC=diamond-like carbon) (FIG. 17).

If the spherical-cap-like segment region 20 is provided with a hard-material coating of this type, this coating functions, as a sliding element. In that case, it is also recommended that a hard-material coating 44 of this type likewise be applied at least to the corresponding spherical-cap-like segment region 19 of the inner bearing ring 9.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A clutch operator for a disconnectable clutch, the clutch operator comprising:
    a housing;
    a self-adjusting release bearing supported on the housing, the release bearing being a rolling-contact bearing comprising:
    an outer bearing ring;
    a rotating inner bearing ring radially inward of and rotatable with respect to the outer bearing ring, and rolling bodies guided between the outer bearing ring and the rotating inner bearing ring;
    an adjusting ring radially inward of the inner bearing ring, the adjusting ring comprising a radially oriented annular flange positioned and configured to support a spring element connected to the disconnectable clutch;
    a sliding element fitted in a supporting region of the adjusting ring and on the inner bearing ring between the inner bearing ring and the adjusting ring, the sliding element comprising complementary spherical-cap segments operable for arranging the release bearing to be pivotable; and
    a noise-reducing and wear-reducing coating on the radially oriented annular flange,
    wherein the coating of the annular flange includes a thermoplastic with a highly heat-resistant polyamide comprising at least one member of a group including polyamide 46 (PA 46), semiaromatic polyamides, polyphthalamide (PPA), polyhexamethylene terephthalamide (PA6T), and copolymers thereof with polyhexamethylene isophthalamide (PA6T/6I), and at least one member of a group including polyhexamethylene adipamide (PA6t/66, PA6T/6I/66) and polymethylpentamethylene terephthalamide (PA6T/MPMDT) with friction-reducing, wear-reducing and strength-enhancing additives.

2. The clutch operator as claimed as claim 1, wherein the outer bearing ring is arranged rotationally fixed.

3. The clutch operator as claimed in claim 1, wherein the sliding element is comprised of a high-strength and wear-resistant plastic, is an add-on part which is produced separately and is secureable to the adjusting ring or is formed integrally on the adjusting ring.

4. The clutch operator as claimed in claim 1, wherein the coating of the annular flange of the adjusting ring is a separate add-on part in the form of a disk.

5. The clutch operator as claimed in claim 4, wherein the disk is formed from a high-strength and wear-resistant plastic, a ceramic or a hard metal.

6. The clutch operator as claimed in claim 1, wherein the coating of the annular flange of the adjusting ring is a plastic disk which is formed integrally on the annular flange.

7. The clutch operator as claimed in claim 1, wherein the noise-reducing and wear-reducing coating is made from plastic, at least at a region of contact with the spring element, and the coating has a microstructure which can be plasticized under load applied by the spring element.

8. The clutch operator as claimed in claim 1, wherein the sliding element is a separate add-on part of plastic on the annular flange and has the form of a spherically configured section of the adjusting ring.

9. The clutch operator as claimed in claim 1, wherein at least one of the sliding element and the disk is a thermoplastic based on a highly heat-resistant polyamide or other highly heat-resistant thermoplastics.

10. The clutch operator as claimed in claim 9, wherein one of the thermoplastics is polyaryl ether ketones (PAEKs).

11. The clutch operator as claimed in claim 1, wherein the additives are at least one of carbon fibers, aramid fibers in an amount by weight of from 1 to 40%, carbon fibers in an amount by weight of from 20 to 30%, aramid fibers in an amount by weight of from 1 to 15%, along with solid lubricants in an amount by weight of from 1 to 5%, and together with none of or at least one of graphite in an amount by weight of from 1 to 10%, a friction reducer, in an amount by weight of from 1 to 30%, and polyphenylene sulfone (PPSO2, Ceramer®) in an amount by weight of from 1 to 30%.

12. The clutch operator as claimed in claim 1, wherein the sliding element and the coating of plastic are formed integrally on the adjusting ring.

13. The clutch operator as claimed in claim 12, wherein the sliding element and the coating are a single piece formed by material-to-material bonding.

14. The clutch operator as claimed in claim 1, wherein at least one of the sliding element and the coating is an add-on part and is at least one of positively connected or cohesively bonded to the adjusting ring.

15. The clutch operator as claimed in claim 14, wherein the adjusting ring has at least one of cutouts, stamp formations, apertures or grooves for fixing at least one of the sliding element or the coating as an add-on part or as parts formed integrally.

16. The clutch operator as claimed in claim 14, wherein the adjusting ring has grooves, based on the center, which are oriented radially with parallel groove walls.

17. The clutch operator as claimed in claim 1, wherein the sliding element is an add-on part and is at least one of positively connected or cohesively bonded to the inner bearing ring.

18. The clutch operator as claimed in claim 1, wherein the sliding element is a hard-material coating at least on the adjusting ring at a spherical-cap segment thereof.

19. The clutch operator as claimed in claim 1, wherein the coating of the annular flange of the adjusting ring or the coating of other friction partners is formed by a hard-material coating.

20. The clutch operator as claimed in claim 1, wherein at least one of the sliding element at least on the adjusting ring or the coating of the annular flange is a hard-material coating formed by a diamond-like carbon coating.

21. The clutch operator as claimed in claim 1, wherein at least one of the sliding element at least on the adjusting ring or the coating of the annular flange is a hard-material coating of a hydrogenated carbon material layer with tungsten fractions.

22. The clutch operator as claimed in claim 1, wherein at least one of the sliding element at least on the adjusting ring or the coating of the annular flange is a titanium-niobium nitride layer or a titanium-niobium oxynitride layer.

23. The clutch operator as claimed in claim 1, wherein at least one of the sliding element at least on the adjusting ring or the coating of the annular flange is a tetrahedral carbon without hydrogen.

24. The clutch operator as claimed in claim 1, wherein at least one of the sliding element at least on the adjusting ring or the coating of the annular flange is a hard-material coating which includes chromium nitride layers incorporating nano-dispersions of chromium carbide (CrC).

25. The clutch operator as claimed in claim 1, wherein at least one of the sliding element at least on the adjusting ring or the coating of the annular flange is a hard-material coating comprising a multiple layer consisting of a hydrogenated carbon material layer with tungsten fractions and at least one layer of a hydrogenated carbon of the a-C:H type.

26. The clutch operator as claimed in claim 1, wherein at least one of the sliding element at least on the adjusting ring or the coating of the annular flange comprises a hard-material coating formed as a supernitride layer.

27. The clutch operator as claimed in claim 1, wherein a hard-material coating is formed on at least one of one contact surface or to at least one running surface of the clutch operator in a thickness of less than or equal to 0.015 mm.

28. The clutch operator as claimed in claim 1, wherein the release bearing comprises a component with a contact zone exposed to wear, the contact zone including a hard-material coating formed by plasma surface coating or by a laser beam.

* * * * *